United States Patent [19]

Keigler

[11] 4,371,135

[45] Feb. 1, 1983

[54] SOLAR ARRAY SPACECRAFT REFLECTOR

[75] Inventor: John E. Keigler, Princeton, N.J.

[73] Assignee: RCA Corporation, New York, N.Y.

[21] Appl. No.: 228,576

[22] Filed: Jan. 26, 1981

Related U.S. Application Data

[63] Continuation of Ser. No. 61,866, Jul. 30, 1979, abandoned.

[51] Int. Cl.³ .......................... B64G 1/00; B64G 1/44
[52] U.S. Cl. ................................... 244/173; 126/425;
126/438; 136/292; 322/2 R
[58] Field of Search .................................. 244/158–161,
244/170, 173; 322/2 R; 126/424, 425, 438, 451;
136/292, 246, 245; 343/754, DIG. 2

[56] References Cited

U.S. PATENT DOCUMENTS

| | | | |
|---|---|---|---|
| 1,599,481 | 9/1926 | Marcuse | 126/438 |
| 3,118,437 | 1/1964 | Hunt | 126/424 |
| 3,196,366 | 7/1965 | Simpson | 126/451 |
| 3,841,302 | 10/1974 | Falbel | 126/425 |
| 3,872,854 | 3/1975 | Raser | 126/424 |
| 3,933,323 | 1/1976 | Dudley et al. | 322/2 R |
| 3,971,022 | 7/1976 | Lenz | 343/754 |
| 4,000,733 | 1/1977 | Pauly | 126/438 |
| 4,078,747 | 3/1978 | Minovitch | 244/159 |
| 4,145,021 | 3/1979 | Gaechter | 126/425 |

OTHER PUBLICATIONS

Billman, "Radiation Energy Conversion in Space," *Third NASA Conf. on Radiation Eng. Conversion*, NASA AMES, Moffiett Field, Calif., Jan. 26–28, 1978, pp. 25–35, 136–145.

Van Patten et al. "The Industrialization of Space," 23rd AAS An. Meet Oct. 18–20, 1977, San Francisco, CA, pp. 7–14.

Cherry, "A Concept for Gen. Comm. Ele. Power from Sunlight," 8th IEEE Proc., Seattle, Wash., Aug. 4–6, 1970, pp. 331–337.

Crawley, "Designing the Space Colony," MIT Tech. Rev., Jul./Aug. 1977, pp. 45–49.

*Primary Examiner*—Galen L. Barefoot
*Attorney, Agent, or Firm*—Samuel Cohen; Robert L. Troike

[57] ABSTRACT

A solar energy reflector useful in space-oriented apparatus for reflecting the rays of the sun to a panel carrying solar cells. The solar cells generate direct current power for conversion into microwave energy for transmission to the earth or other spacecraft. The reflector comprises a rotating mirror and a fixed mirror arranged to reflect the solar energy rays to the solar cell panel continuously.

8 Claims, 12 Drawing Figures

SOLAR ARRAY SPACECRAFT REFLECTOR

This is a continuation of application Ser. No. 061,866, filed July 30, 1979, now abandoned.

This invention relates to the use of solar energy in space and particularly to apparatus, in space, for reflecting solar rays to a solar energy converter, which may be used, for example, for producing microwave signals for transmission to the ground or to other locations in space.

Various proposals have been made to utilize the energy of the sun for direct conversion into electrical energy. Recently it has been proposed to use a satellite as a station to collect solar energy and to convert the d.c. energy from the sun into microwave energy for transmission to and collection at ground stations for conversion into electrical energy. One approach, which may be considered a "brute force" approach, utilizes a large solar cell array to generate megawatts if not gigawatts of power which is processed with conventional techniques to supply banks of transmitter tubes to generate the RF energy. Also see, for example, a paper entitled "Attitude Control of Large Solar Power Satellites" by R. E. Oglevie, AIAA 78-1266, (conference Aug. 7–9, 1978), pp. 571–578 and a paper entitled "Advanced Lightweight Solar Array Technology" by L. G. Chidester, AIAA 78-533, (conference Apr. 4–7, 1978), pp. 55–60.

Such approaches, whether for high power direct broadcasting to small low-cost terminals or for transmission of bulk microwave power from a solar power satellite to a large area ground station receiver antenna system for terrestrial distribution, utilize the direct current power from a large area solar array for voltage regulation, then provides the direct current power to one or more high power transmitters such as Klystrons or traveling wave tubes.

It has been proposed recently to utilize solid-state power amplifying devices to replace vacuum tubes for generating the RF energy. The power amplifiers are energized by solar energy from solar cells mounted on one face of a planar array and coupled directly to amplifiers mounted on the other face of the array. Printed circuit antennas mounted adjacent the amplifiers on the same face provide a plurality of RF beams for propagation to the earth. Large EIRP (equivalent isotropic radiated power) can be generated by controlling the solid-state amplifiers as elements of a phased array so that the radiated RF power adds coherently in the far field as a narrow beam. See for a detailed description of this arrangement in U.S. patent application Ser. No. 057,109, (RCA 73,249), entitled "Microwave Radiator Utilizing Solar Energy" filed by Fred Sterzer on July 12, 1979, and assigned to the same assignee as this application.

One system for converting solar energy of electrical power is discussed in U.S. Pat. No. 3,781,647 issued Dec. 25, 1975. This system utilizes solar energy which powers a solar array which continuously must be maintained in a proper orientation relative to the sun.

A system which uses a multiple of individually steered mirrors in a feedback system is described in U.S. Pat. No. 4,013,885 issued Mar. 22, 1977.

There is a need for a space orbiting system to utilize solar energy in which the platform for generating mirowave power signals for transmission is maintained in a fixed orientation pointing toward a desired location such as the earth in an orbit such as at geosynchronous altitude while having the sunlight substantially continuously directed to the fixed platform.

According to the present invention, the use of one fixed and one rotating mirror provides reflected rays of solar energy continuously to a surface fixed in space carrying solar cells.

Figure 1:
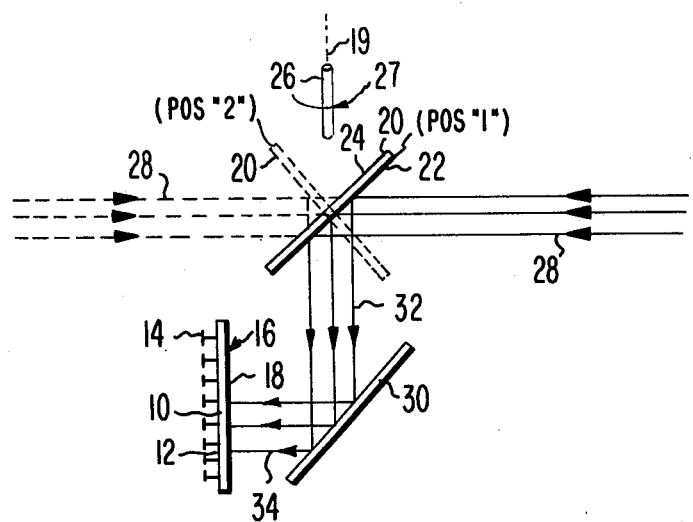
FIG. 1 is a schematic diagram illustrating the principle of the invention.

FIG. 1 illustrates a solar energy to microwave energy generating platform 10 supported by a suitable spacecraft or satellite (not shown) and oriented such that the face 12 carrying microwave antennas 14 is continuously facing a fixed location on the earth. Any spacecraft may be used in the practice of the invention provided it is capable of maintaining the converter 10 in an orientation that keeps the face 12 carrying the antennas 14 accurately facing to a desired direction. Suitable spacecraft are described in U.S. Pat. No. 3,695,554 isued Oct. 3, 1972 to K. J. Phillips and U.S. Pat. No. 4,071,211 issued Jan. 31, 1978 to L. Muhlfelder et al. The spacecraft further may be provided with rechargeable batteries to provide electrical energy to the drive motors on the spacecraft which motors are used to orient the converter 10, or the solar cells may be used to provide the power directly to these motors without the need for batteries.

Side 16 carrying solar cells 18 is facing away from the earth and may or may not intercept solar rays throughout the orbit of the spacecraft. A planar mirror 20 having a reflecting surface 22 is rotatable on a shaft 26 around the shaft axis 19 which passes through the mirror 20 and is at 45° to the mirror surface 22. Shaft 26 is rotatable in direction 27 noting that axis 19 ahd shaft 26 are in the plane of the paper. The shaft 26 is substantially perpendicular to the rays 28 of the sun when the system is in the equatorial orbit shown in FIG. 2. Sun rays 28 are reflected from mirror 20 to a fixed mirror 30 and then to the surface of the converter 10 carrying the solar cells 18 along first reflection path 32 and second reflection path 34, respectively. Optimally, path 34 is at right angles to the plane of the solar cell array 18. Sun rays 34 impinging upon solar cells 18 cause these cells to produce a d.c. signal for utilization by the microwave apparatus for generating an RF signal for transmission to the earth by antennas 14. A suitable apparatus for converter 10 is described in the aforementioned U.S. patent application by Fred Sterzer.

For rays of the sun pointing from any direction extending from the orbit plane to a plane perpendicular to the plane of the paper of FIG. 1, the rotating mirror 20 can be positioned to reflect the rays to fixed mirror 30 and then onto solar cells 18. Positions 1 (solid) and 2 (dotted) of the mirror 20 in the plane of the paper are shown for illustration of the principle of the invention. It should be understood that all of the sun's rays behind and in front of the plane of the paper will cause a reflected beam of sun rays toward the fixed mirror 30 from the appropriately positioned rotating mirror 20. Thus, whether the position of the converter structure 10 in space is such that the mirror 20 receives the sun rays 28 when the mirror is in position 1 or the sun rays 28 when the mirror is in position 2, the reflected beams from the mirror 20 will always assume the path 32 as illustrated. It is to be noted that the sun's rays are parallel to the plane of equatorial orbit of the earth only during two days of the year, viz., the spring or fall equinoxes. At other times the sun's rays are skewed to the equatorial orbit of the earth from day to day to a maximum of 23° in either direction above and below the equator. In order for mirror 30 to receive sun rays as the sun moves above and below the plane of the orbit, either mirror 20 must be oversized or be pivoted as described below for FIGS. 8, 9 and 10. With such sun inclination tracking, mirror 30 will then always receive sun rays except for the spring and fall equinox eclipse periods.

Figure 2:
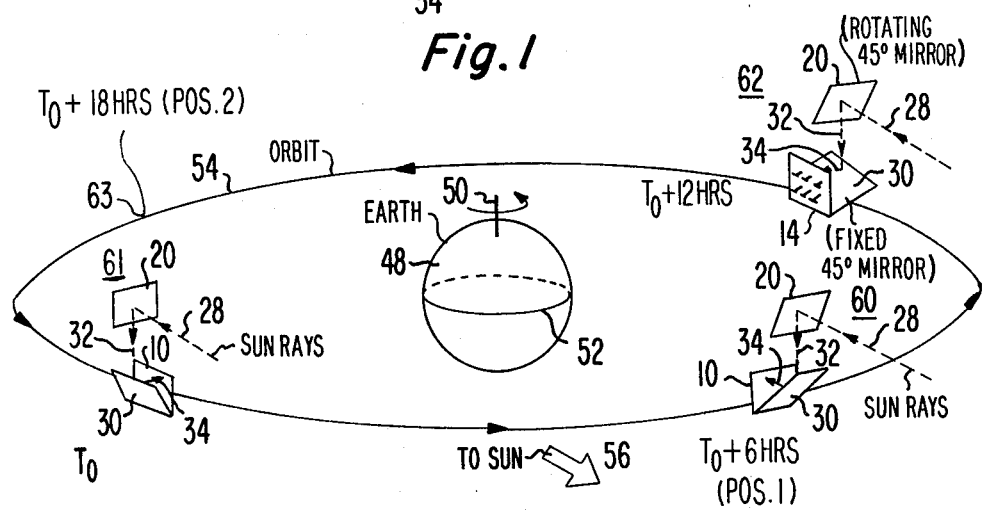
FIG. 2 is a schematic of the structure of one embodiment of the invention in several positions in orbit about the earth.

Reference is made to FIG. 2 showing various positions of the converter structure 10 in an orbit 54 about the earth 48 which is rotating about its axis 50. Orbit 54 is in the plane passing through the equator 52 of earth 48. Accordingly, orbit 54 is what is known as an equatorial orbit and the satellite is orbiting in what is known as a geosynchronous orbit. In such an orbit the satellite travels in space about the earth once per day at a rate corresponding to the rotation rate of the earth. Accordingly, the spacecraft will appear to an observer on the earth (or to an earth station antenna) to hover over one fixed point on the equator notwithstanding the orbital motion of the satellite about the earth. In the three positions shown in FIG. 2, the sun is assumed to be located in space relative to earth 48 from the location as indicated by arrow 56. The sun, during a 24-hour period, transmits rays 28 to the converter 10 as indicated by the example positions 61, 60 and 62, respectively.

Converter 10 and fixed mirror 30 (preferably at a 45° angle relative to the plane of converter 10) rotate about the orbit axis once per orbit period, while the rotating mirror 20 makes one revolution per orbit about its shaft axis 26 (arrow 27, FIG. 1) in the opposite direction with respect to the converter 10 and the spacecraft. Thus the mirror 20 is maintained with a constant orientation to the sun (56), that is, mirror 20 is essentially fixed in space while converter 10 rotates with the spacecraft about the earth's axis 50. With suitable attitude control means, the spacecraft will orient the converter 10 to point towards the earth 48 and support the rotating mirror 20 to maintain the required sun oriented attitude.

Figure 7:
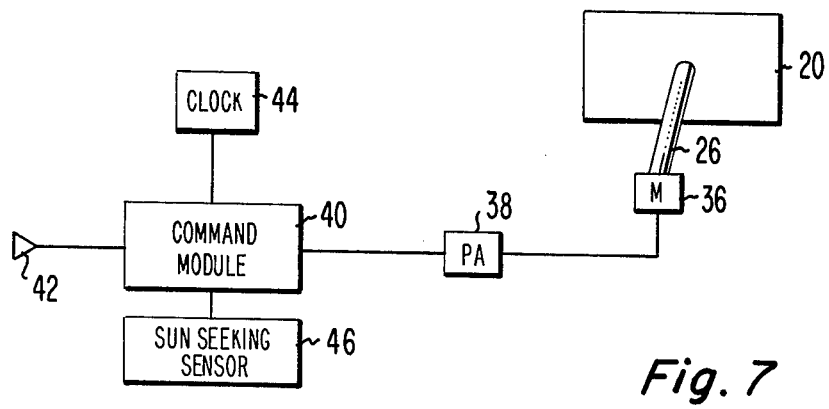
FIG. 7 is a block schematic of a control system for operating a rotating mirror.

A suitable once-per-orbit drive for the rotating mirror is illustrated in FIG. 7.

Referring to FIG. 7, mirror 20 is rotated about the axis of shaft 26 once per orbit under control of means that are operable by ground control signals or automatically operable under a programmed sequence. Mirror 20 is fixed to shaft 26 which is rotated by motor 36 energized by a power amplifier 38 under control of a command module 40 responsive to ground control signals received by antenna 42. In one alternative, command module 40 may be programmed via a clock 44 to cause mirror 20 to rotate according to the position of the spacecraft in the orbit relative to the position of the sun. In another alternative, a sun-seeking sensor 46 provides control signals indicative of the sun position to the command module 40 for rotating mirror 20 to a position to face the sun.

Figure 4:
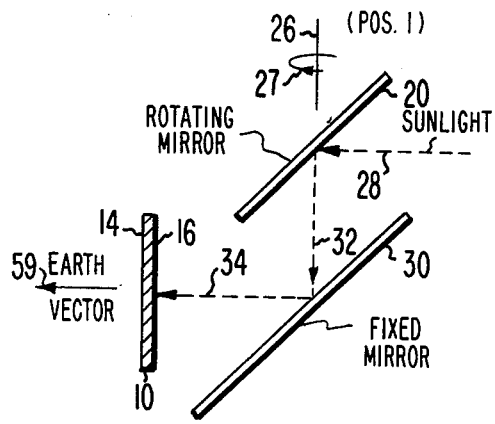
FIGS. 4 and 5 are schematic diagrams illustrating the means by which sunlight is reflected to a planar surface of a satellite in two different orientations, respectively.

Assuming the spacecraft is in position 61 at time $T_0$ shown in FIG. 2, mirror 20 will be in the orientation shown such that sun rays 28 are reflected along path 32 and thence path 34 to impinge on the solar array surface 16 of the converter 10. Six hours later ($T_0+6$ hours) at position 60, sun rays 28 will impinge on mirror 20 now rotated 90° relative to mirror 30 to reflect sun rays 28 via paths 32 and 34 to impinge on the solar cells 16. FIG. 4 shows the position of the various elements at this time (when in position 60). In position 62, twelve hours later ($T_0+12$ hours), mirror 20 has rotated an additional 90° relative to mirror 30 to reflect the sun rays 28 along path 32 and path 34 to solar cells 16 on the surface, not seen in this view of converter 10. Other positions in the orbit 54 not shown in FIG. 2 may be easily visualized in terms of the relative positions of mirror 20 and mirror 30 to the sun to maintain continuous reflection of the sun rays on the converter solar cells 16.

Figure 3:
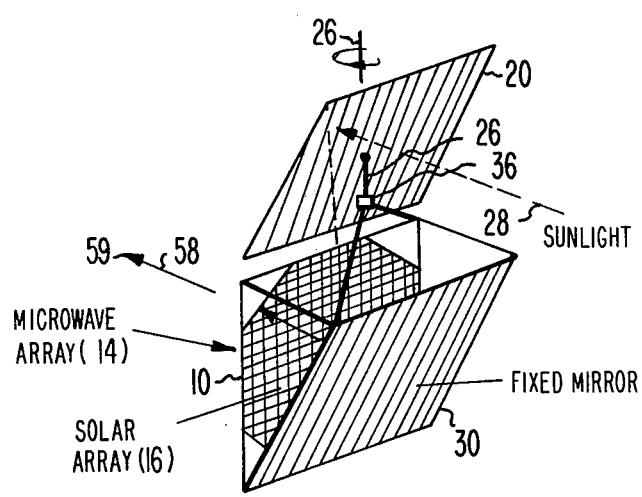
FIG. 3 is a detailed schematic diagram of the apparatus of one embodiment of the invention.

FIG. 3 illustrates one embodiment of the reflector apparatus of the invention. Converter 10 is assumed to be oriented in the plane perpendicular to the earth pointing vector 58 such that the face carrying the solar arrays 16 is facing in the negative direction of the vector 58, that is, opposite to that of arrowhead 59, while the face of converter 10 carrying the microwave antennas 14 is facing towards the earth. Fixed mirror 30 is disposed at an angle of 45° relative to the plane of converter 10. Mirror 20 is mounted on shaft 26 and driven by motor 36 about the mirror array axis of shaft 26. Sunlight 28 reflected from mirror 20 is reflected to fixed mirror 30 and to the solar array surface 16 along paths 32 and 34.

Figure 5:
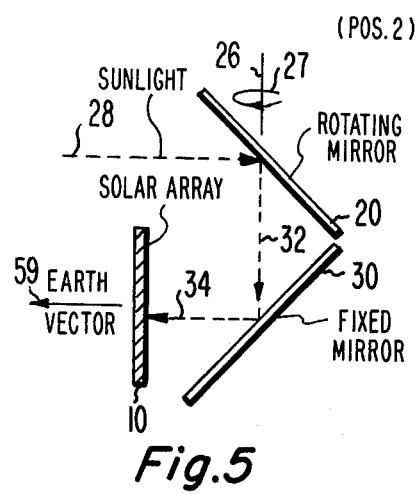

FIG. 4 illustrates the reflecting paths that occur for the mirrors in position 1 while FIG. 5 illustrates the paths for the mirror in position 2, which positions are as shown in and described above for FIG. 1 and in FIG. 2 at positions 60 and 63. The sun direction is 56 in FIG. 2, the rays 28 coming from the sun. In FIG. 5, the earth vector 59 is being used as a reference which is the reason that the rays 28 appear to be in the opposite direction from the rays 28 in FIG. 4.

Figure 6:
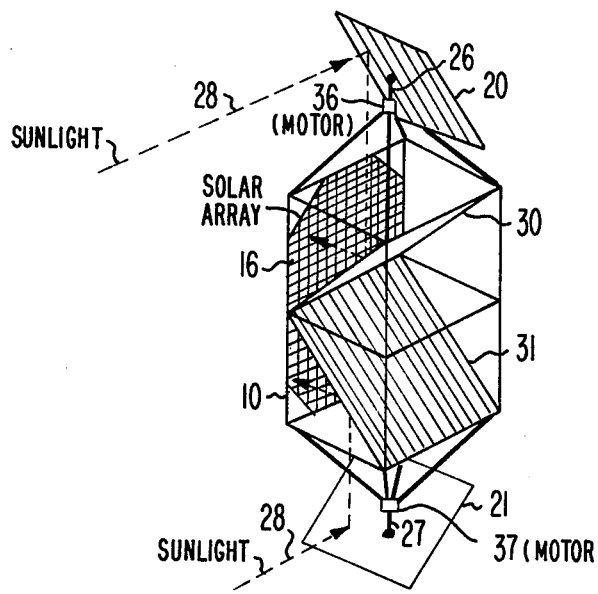
FIG. 6 is a schematic of a different embodiment of the invention utilizing two rotating mirrors.

In a modified form of the embodiment illustrated in FIG. 3, a pair of rotating mirrors is provided as illustrated in FIG. 6. The solar array 16 is mounted on converter 10 and positioned relative to the two fixed mirrors 30 and 31 at an angle of 45° with respect to each mirror. The first rotating mirror 20 is rotated about its shaft 26 by its own motor 36, while a second rotating mirror 27 is rotated about its shaft 27 by its motor 37. In the alternative, one motor, either motor 36 or 37, is used with suitable driving mechanisms (not shown) for rotating the shafts 26 in synchronism. Shafts 26 and 27 are, in either arrangement, preferably aligned along a common axis. In operation, the two mirrors 20 and 21 are rotated in synchronism to reflect the sunlight 28 through the respective surfaces to the solar array cells 16. In this form of the invention, a symmetrically rotating system is provided to reduce disturbance effects and thereby reduce the strain that such effects would have on the attitude control system of the satellite carrying the converter 10.

Further modifications of the apparatus illustrated in FIGS. 3 and 6 include providing the rotating mirror (20, 21) with a second degree of freedom movement or a complex rotation to maintain maximum efficiency of sun tracking when the sun is not in the plane of the orbit 54. In a geosynchronous equatorial orbit, the sun moves at an annual rate above and below the orbit plane 54 through a total angle of 46° (i.e., 23° above and below the equator). Accordingly, to track the sun the mirror 20 may be pivoted while being rotated at a rate corresponding to the ±23° changes in the tracking path of the sun.

Figure 8:
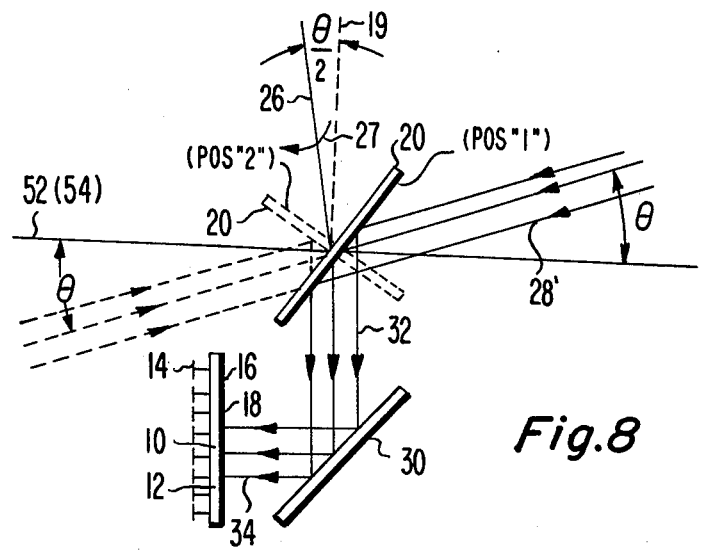
FIG. 8 is a modification of the diagram of FIG. 1 for reflecting the sun's rays that are at an inclination to the orbit of the satellite.

In order to understand the effect of these seasonal inclinations of the sun above and below the equatorial plane during the seasons between the equinoxes, reference is made to FIG. 8, showing the inclination of the sun's rays at an angle theta ($\theta$) with respect to positions 1 and 2 described above with respect to FIG. 1. In order to provide the best reflection angle such that reflected rays from the inclined sun's rays are substantially maintained parallel to the original reflected rays 32 described above with respect to FIG. 1, the shaft 26 of mirror 20 is tilted by an angle ($\theta/2$) as shown in FIG. 8 wherein $\theta$ is the angle of incidence of the sun's rays with respect to the orbit plane 54, which for a satellite system in a geosynchronous orbit, is parallel to the earth's equatorial plane 52. According to the invention, by changing the axis of rotation of mirror 20 by pivoting shaft 26 with respect to the reference axis 19 by an angle ($\theta/2$), incident rays 28' from the sun at an angle $\theta$ will be reflected to mirror 30 along paths 32 and thence to the solar cells 18 along paths 34. It should be understood since the angle of incidence is equal to the angle of reflection of the sun rays 28', merely pivoting mirror 20 by the angle ($\theta/2$) results in a total reflection by the mirror of the angle $\theta$. Thus the reflection along paths 32 is maintained the same as for the situation in which there is no inclination of the sun's rays.

Any arrangement to both pivot and rotate shaft 26 to track the sun's position relative to the converter structure in orbit may be used.

Figure 9:
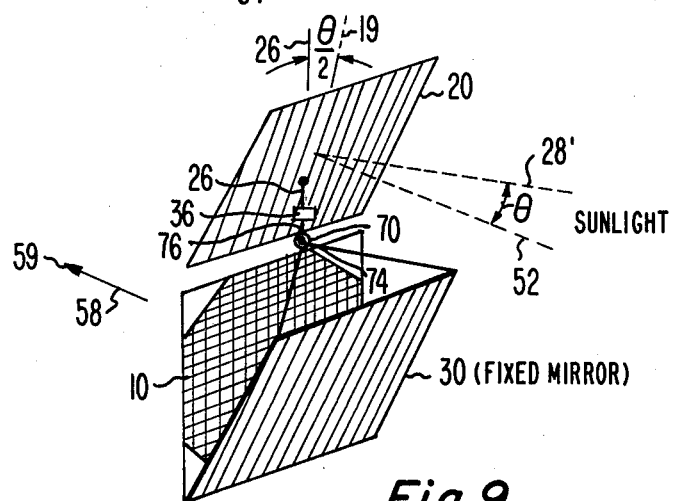
FIG. 9 is a modification of the diagram of FIG. 3 to show the orientation of the rotation mirror 20 for the sun's rays that are at the inclination to the orbit of the satellite illustrated in FIG. 8.
Figure 10:
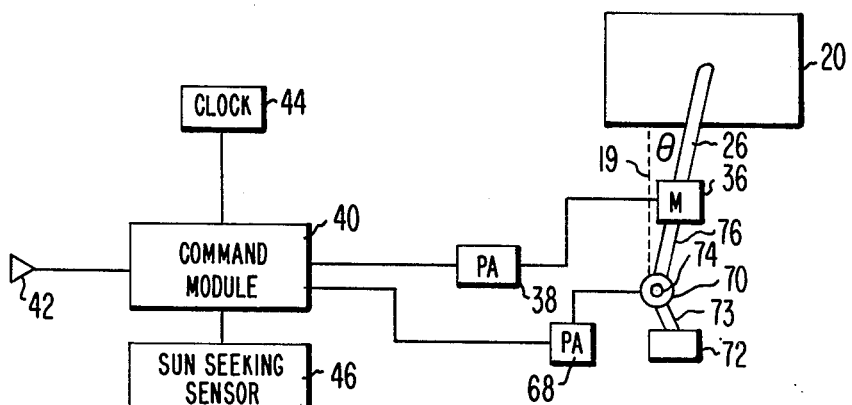
FIG. 10 is a block schematic for a modified form of the control system of the invention shown in FIG. 7 for seasonal changes in the inclination of the sun's rays.

A suitable arrangement for pivoting the mirror shaft axis 26 in order to track the sun as the inclination varies above the orbit plane by 23° and below the orbit plane by 23° is shown in FIGS. 9 and 10. Shaft 26 is driven by motor 36 which, in turn, is supported on a nonrotatable shaft 76 which has its axis coincident with the axis of shaft 26. Shaft 76 is rigidly connected perpendicularly to a shaft 74 of a motor 70 so that as the motor shaft 74 rotates, it will pivot shaft 76 (as well as motor 36 and shaft 26) in a plane perpendicular to the motor shaft 74. Motor 70 is rigidly supported to the spacecraft structure at spacecraft portion 72 such that its shaft is perpendicular to reference axis 19. Motor 70 is suitably a steppermotor that rotates shaft 74 in either rotation direction in discrete steps at one half the rate of inclination changes of the sun. Thus, in this embodiment in which the structure is in a geosynchronous orbit, stepper-motor 70 will pivot the reflecting mirror 20 (via elements 26, 36 and 76) ±11½° relative to reference axis 19.

The control system FIG. 10 for this embodiment modifies FIG. 7 by the provision of an additional power amplifier 54 under control of command module 40. Command module 40 provides signals either by a programmed clock 44, an automatic sun-seeking sensor 46, or manual signals from the ground via antenna 42, to drive the shaft pivoting motor 70 via amplifier 68 to pivot the motor shaft 74 at an angle that will track or approximately track in steps, the inclination of the sun. In such a manner, sunlight 28' (FIGS. 8 and 9) is reflected from mirror 20 and thence to fixed mirror 30 to the solar cells 18 as described above in the discussion of FIG. 8.

Figure 11:
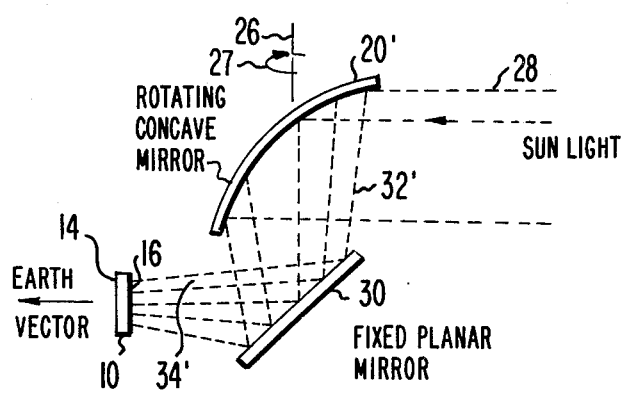
FIG. 11 is a modification of the reflecting structure of the invention using a rotating concave mirror.
Figure 12:
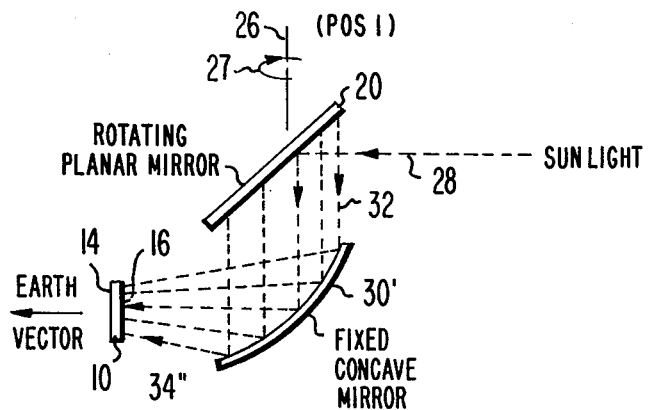
FIG. 12 is a modification of the reflecting structure of the invention using a fixed concave mirror.

A still further modification of the reflector apparatus provides for the use of a concave reflector for either the rotatable mirror 20 or the fixed mirror 30. An arrangement by which a rotating concave mirror 20' is used is shown in FIG. 11. By this arrangement a larger amount of sunlight 28 can be reflected to flat mirror 30. Because of the concave reflection, the reflected rays 32' are converged as shown, thereby continuing the convergence of the reflected rays 34' from flat mirror 30. As shown in FIG. 12, the fixed planar mirror 30 is replaced by a concave mirror 30' which reflects the parallel reflected rays 32 into converged rays 34" to the converter 10.

Using a concave reflector surface will allow for a reduction of the solar cell area from that corresponding to the area of solar cells utilizing a flat or planar mirror due to the converging or focusing effect that is achieved. The concave reflector provides thereby higher illumination per unit area of solar cells. Thus more solar energy can be reflected on a given solar cell to achieve a higher electrical output therefrom.

It should be understood that the use of the invention is not limited to an earth-oriented antenna on a satellite which is in an equatorial synchronous orbit (geosynchronous orbit), but that it may be used in systems which employ some slower and/or non-linear rotating mirror rates to point the microwave antenna toward another orbiting satellite or toward a deep space vehicle.

The provision of both pivoting as well as rotating the reflecting mirror 20 provides the means for reflecting sunlight to a solar panel in most any orientation.

What is claimed is:

1. A solar energy converter apparatus for use in a planet orbiting satellite, said satellite including attitude control means to control the orientation of one axis of the satellite to a desired reference and means for maintaining one surface of the satellite always facing a given object while in orbit about said planet, said apparatus comprising:
    (a) a panel receptor member including energy converting means having one surface containing solar cells for receiving reflected rays of the sun to generate power and an opposite second surface mounted to said one surface containing an antenna which continuously faces a given object;
    (b) a fixed reflecting member having a reflecting surface facing and at a fixed acute angle to said one surface of said receptor member;
    (c) a rotatable reflecting member adapted for rotation about an axis such that in all positions of the rotatable member, the reflecting surface of the rotatable member faces the reflecting surface of said fixed reflecting member; and (d) a means for rotating said rotatable member about its axis and relative to said fixed reflecting member so that its reflecting surface always faces the sun, whereby the rays of the sun are substantially continuously reflected from said rotatable reflecting surface to said fixed reflecting surface and onto said one surface of said receptor member while said opposite surface continuously faces a given object.

2. The apparatus of claim 1 wherein said satellite is at geosynchronous altitude, and the reflecting surface of said fixed reflecting member is disposed at an angle of 45° with respect to said receptor member surface and the axis of rotation of said rotatable reflecting surface is such as to continuously direct the rays of the sun at 45° to the reflecting surface of said fixed member.

3. The apparatus of claim 1 wherein said fixed reflecting member is a planar member.

4. The apparatus of claim 1 wherein either of said fixed and rotatable reflecting members has a concave reflecting surface positioned to reflect incident solar rays so as to converge reflecting rays to said receptor member surface.

5. The apparatus of claim 1, further comprising a second fixed reflecting member and a second rotatable reflecting member, said second fixed reflecting member being disposed at an angle of 45° with said first surface and at 90° with respect to the first-mentioned fixed reflecting member, said second rotatable reflecting member being disposed in symmetrical relation with the first-mentioned rotatable member and having an axis of rotation that is aligned with the rotation axis of the first-mentioned rotatable reflecting surface.

6. The apparatus of claim 1 further including means for pivoting said rotating reflecting member in synchronism with the seasonal inclination changes of the solar rays with respect to the orbit of said satellite in such a way as to maintain constant the angle at which solar rays intersect the reflecting surface of the fixed reflecting member.

7. The apparatus of claim 6 wherein said pivoting means includes motor means having a rotatable shaft coupled to said rotatable reflecting member means to rotate said rotatable member to track seasonal changes of inclination of the solar rays.

8. A solar converter system for use in a satellite in space in synchronous orbit about a rotating planet such that one surface of a satellite continuously faces the planet, comprising in combination:

a panel member mounted to said one surface of said satellite and including energy converter means having solar cells on a first flat surface and an antenna array on the opposite surface, where said opposite surface and said antenna array continuously face said planet;

a first mirror in fixed relation to the member, having a reflecting surface facing the first surface and being at an acute fixed angle thereto;

a second mirror, this one rotatable about an axis such that the reflecting surface of the second mirror always faces the reflecting surface of first mirror regardless of the position of the second mirror on its axis; and means for rotating the second mirror about its axis and relative to said first mirror as the satellite orbits the planet, in such a way that the reflecting surface of the second mirror continuously faces the sun and directs the sun's rays onto the reflecting surface of the first mirror, the latter reflecting these rays onto the first surface of the first member.

* * * * *